Figure 1:
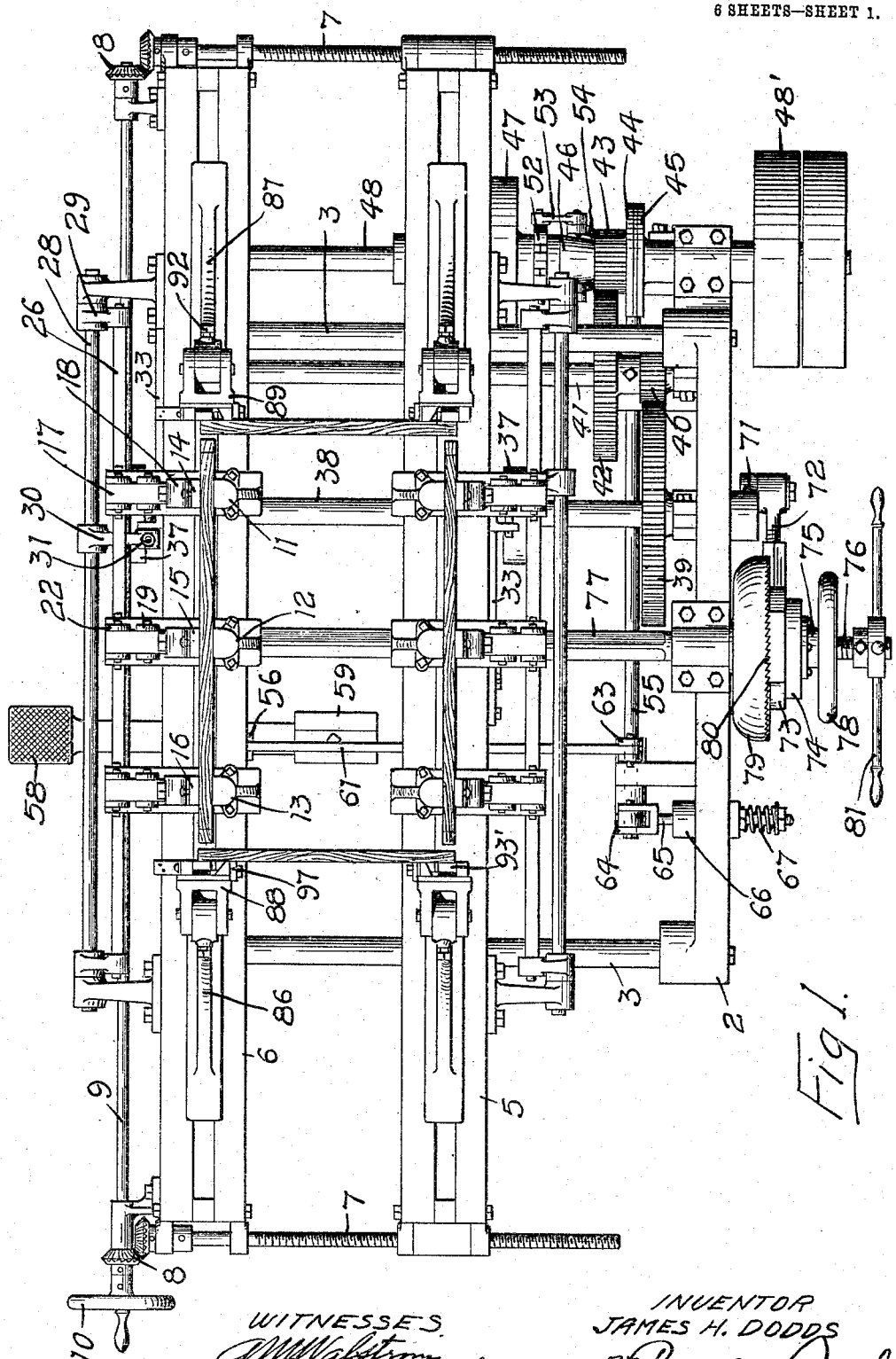

J. H. DODDS.
SETTING UP MACHINE.
APPLICATION FILED JUNE 22, 1908.

947,174.

Patented Jan. 18, 1910.
6 SHEETS—SHEET 1.

WITNESSES
INVENTOR
JAMES H. DODDS
BY Paul & Paul
HIS ATTORNEYS

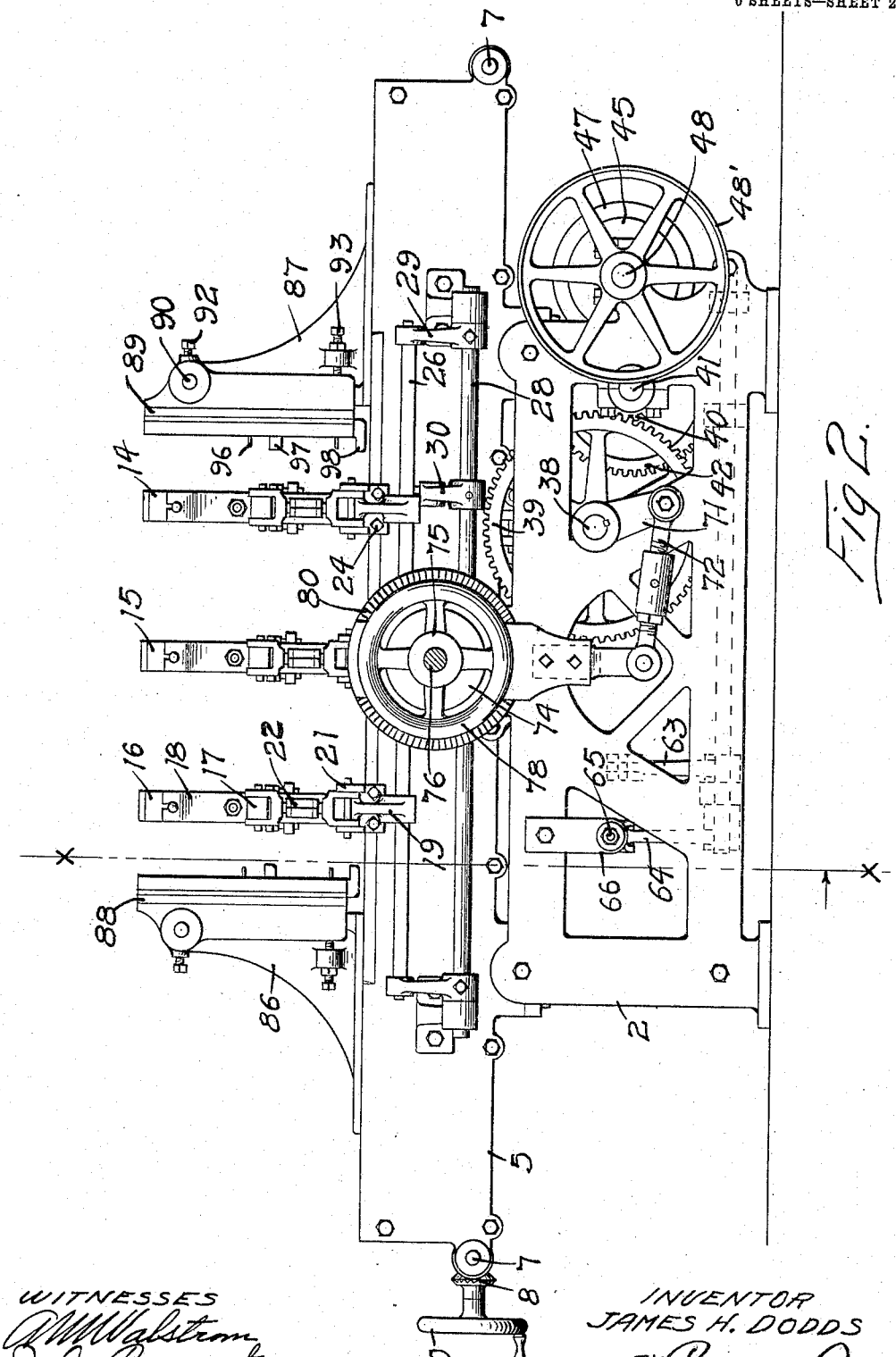

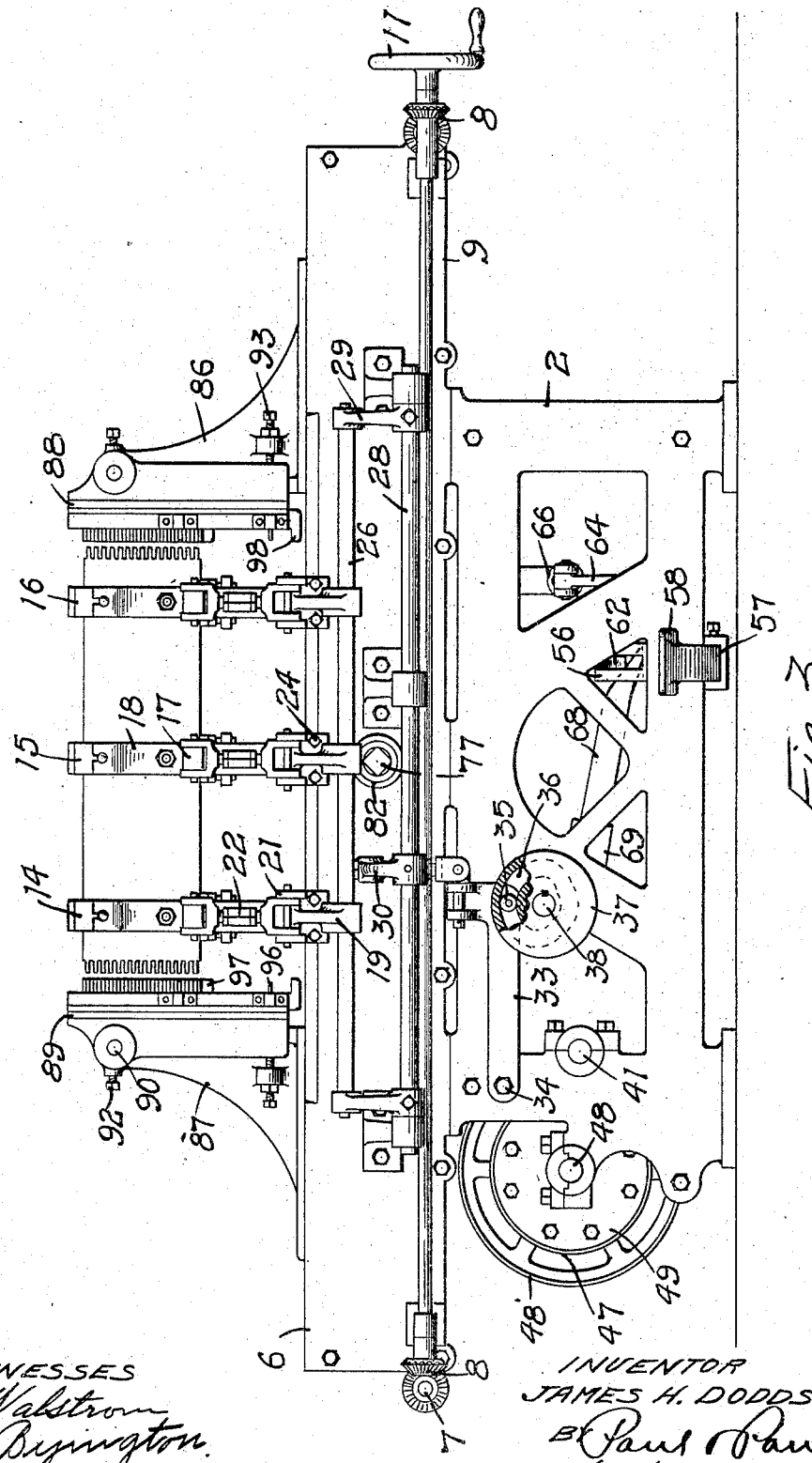

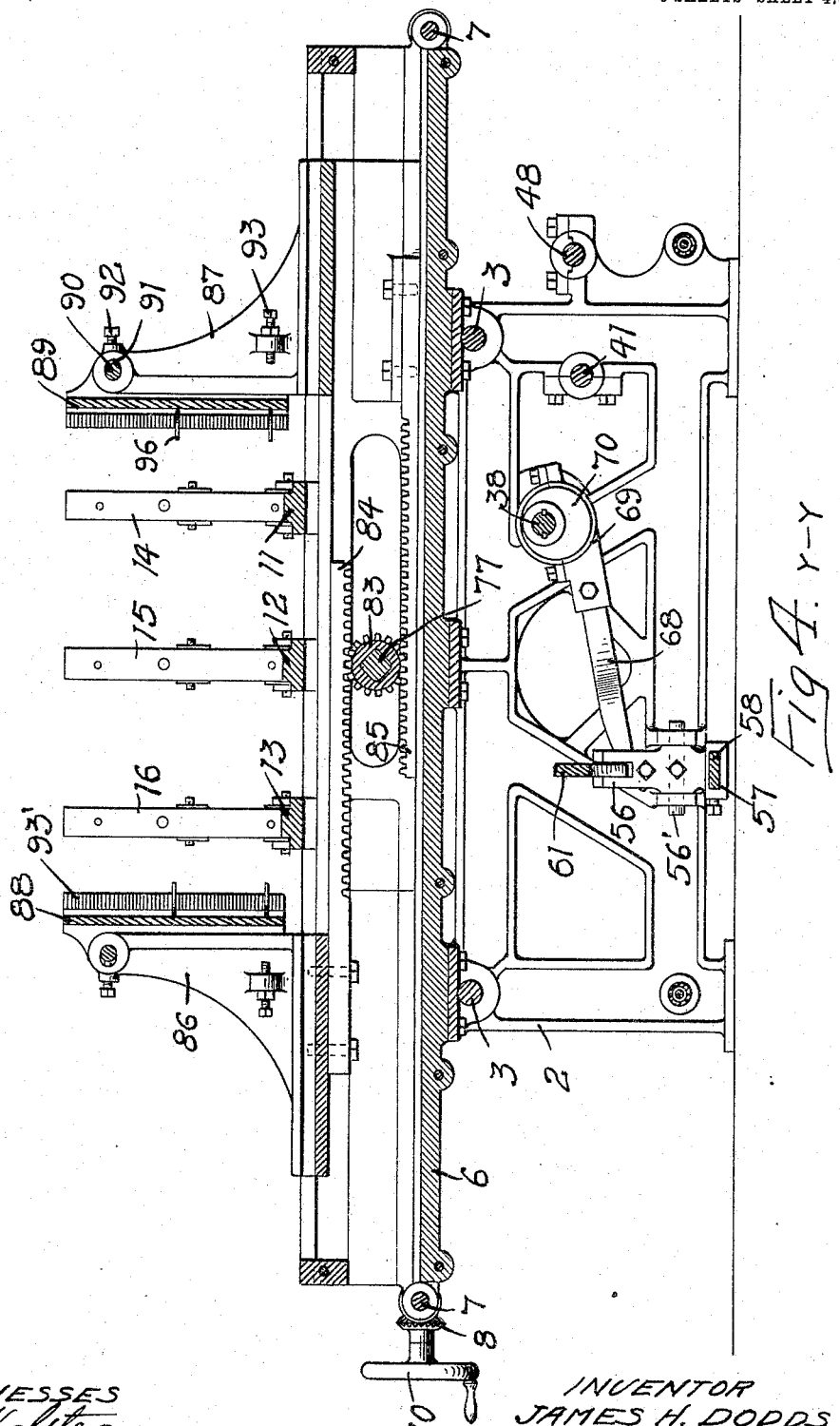

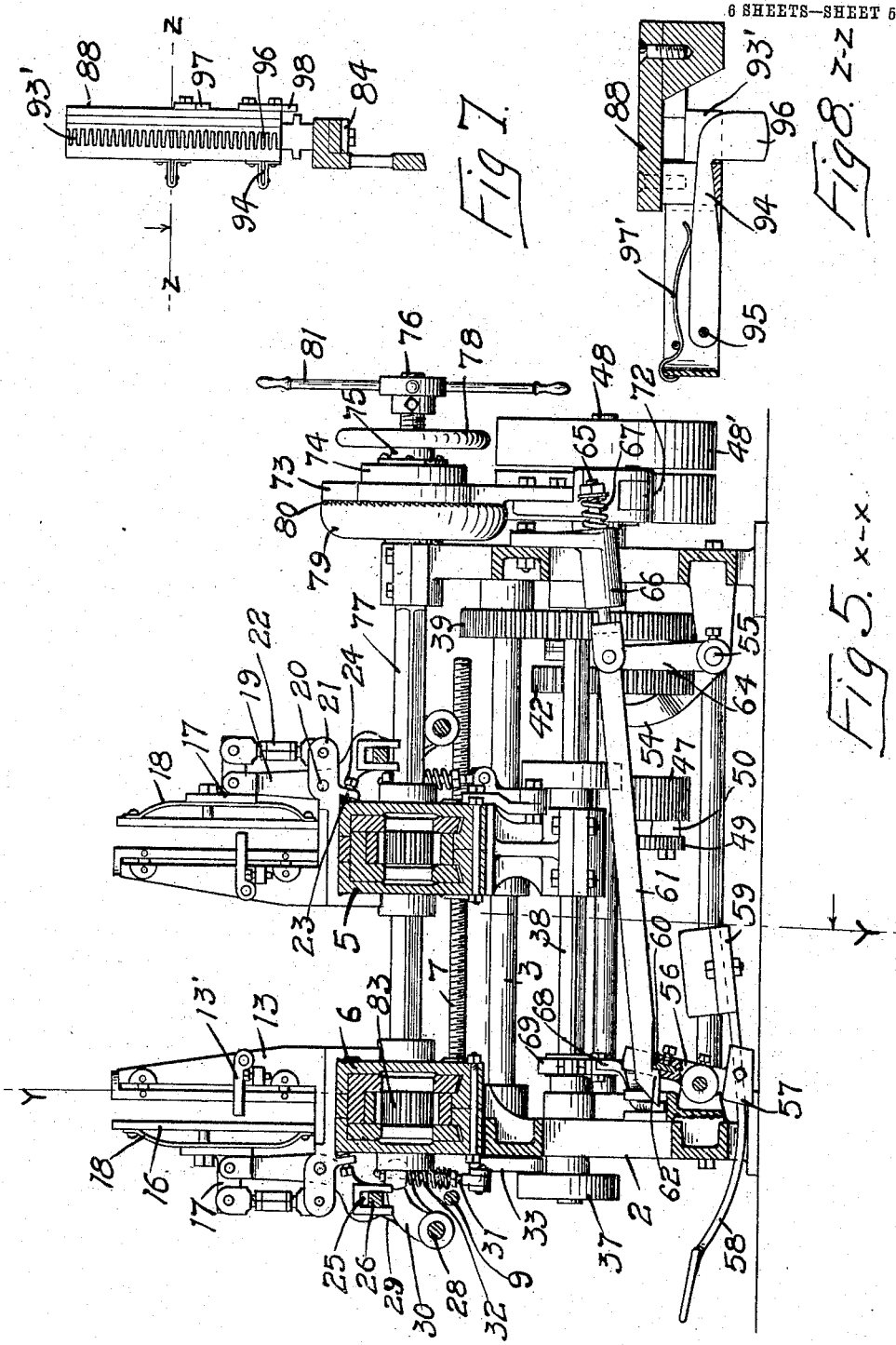

J. H. DODDS.
SETTING UP MACHINE.
APPLICATION FILED JUNE 22, 1908.
947,174.
Patented Jan. 18, 1910.
6 SHEETS—SHEET 6.
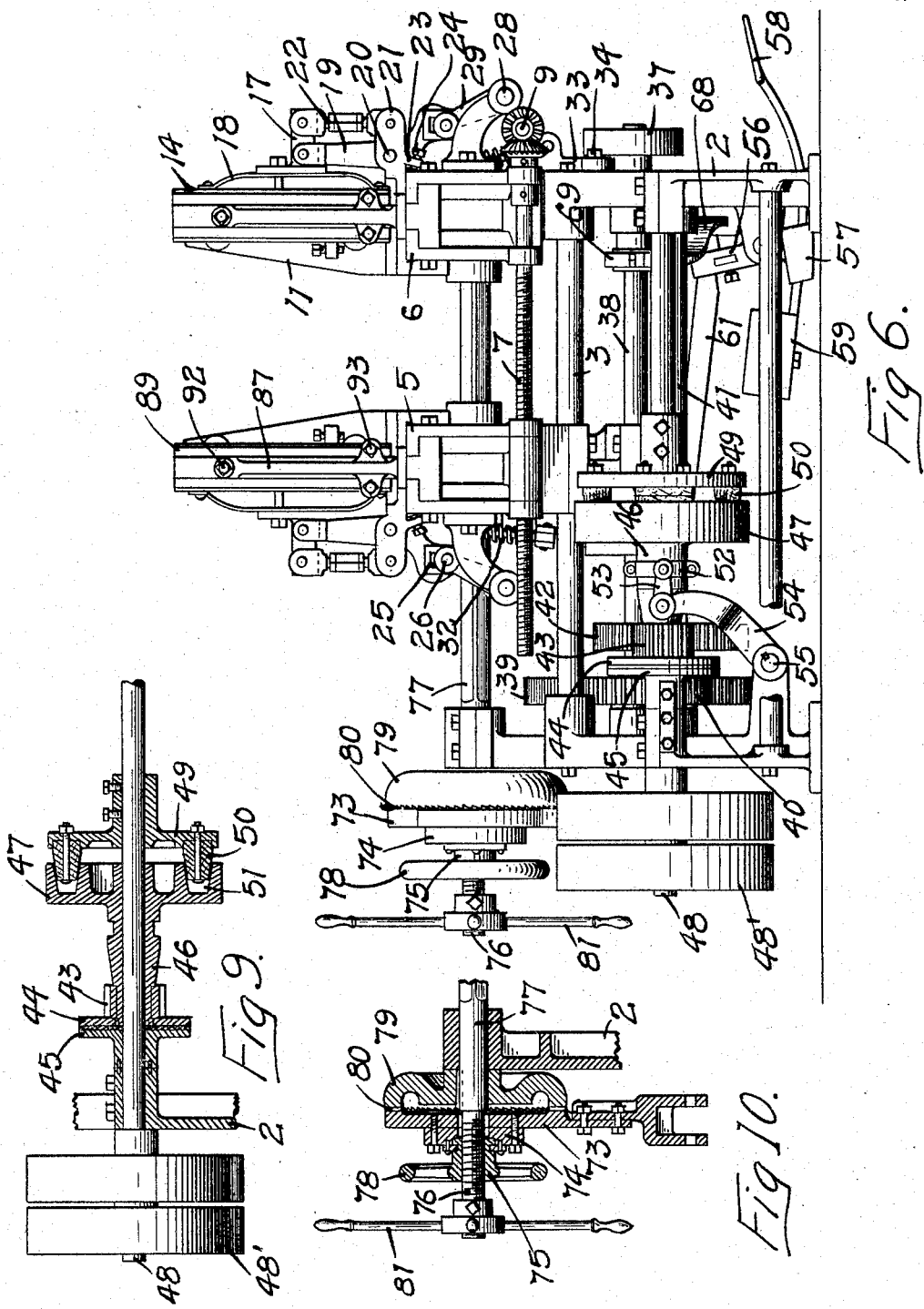
WITNESSES
INVENTOR
JAMES H. DODDS
BY Paul & Paul
HIS ATTORNEYS

UNITED STATES PATENT OFFICE.

JAMES H. DODDS, OF ST. PAUL, MINNESOTA, ASSIGNOR TO DOVETAIL BOX MACHINE CO., OF ST. PAUL, MINNESOTA, A CORPORATION.

SETTING-UP MACHINE.

947,174.  Specification of Letters Patent.  Patented Jan. 18, 1910.

Application filed June 22, 1908. Serial No. 439,786.

*To all whom it may concern:*

Be it known that I, JAMES H. DODDS, of St. Paul, Ramsey county, Minnesota, have invented certain new and useful Improvements in Setting-Up Machines, of which the following is a specification.

My invention relates to machines employed in the manufacture of boxes having the ends of its walls dovetailed together, thereby dispensing with the use of nails and producing a stronger box.

The object of the invention is to provide a machine by means of which the mortises and tenons formed in the ends of the walls may be squeezed or pressed into inter-locking relation with one another.

A further object is to provide a machine of this type having a large capacity and capable of rapid and uniform work.
Other objects of the invention will appear from the following detailed description;

The invention consists generally in various constructions and combinations, all as hereinafter described and particularly pointed out in the claims.

In the accompanying drawings forming part of this specification, Figure 1 is a plan view of the machine embodying my invention, Fig. 2 is an elevation looking at one side of the machine, Fig. 3, is a similar view of the opposite side of the machine, Fig. 4, is a vertical, longitudinal sectional view on the line Y—Y of Fig. 5. Fig. 5 is a transverse sectional view on section line $x$—$x$ of Fig. 2. Fig. 6 is an end elevation of the machine, Fig. 7, is a detailed view showing the construction of one of the jaws, and the means for alining the box boards therein, Fig. 8 is a sectional view on the line Z—Z of Fig. 7, Fig. 9 is a sectional view illustrating the manner of transmitting the power from the driving shaft, Fig. 10, is a detailed sectional view illustrating the means employed for adjusting the jaws to obtain the desired pressure on the boards.

In the drawing, 2 represents a suitable frame on which the operating parts of the machine are mounted. In this frame, cross rods 3 are arranged, supporting parallel beams 5 and 6, the former being movable, back and forth on the rods 3 while the latter is stationary. Threaded rods 7 are provided at the ends of the beams 5 and 6, and connected thereto and are geared at 8 to a longitudinal rod 9 having an operating wheel 10. By turning this wheel, the attendant may move the beam 5 back and forth on the rods 3, to increase or decrease the distance between the beams and vary the space between the clamping jaws according to the size of the box to be operated upon. Upon the beams 5 and 6, a series of jaws 11—12 and 13 are mounted, those on one beam being opposite and coöperating with the corresponding jaws on the other beam to hold the side boards of the box in parallel relation during the squeezing or pressing operation. The jaws are adjusted the desired distance apart according to the width of the box by means of the movable beam as heretofore explained.

For the purpose of gripping the side boards and holding them against the jaws 11—12 and 13 during the operation of the machine, I provide a series of gripper plates 14—15 and 16 supported upon levers 17 between which and the said plates, flat springs 18 are arranged and adapted to yield to accommodate the plates to any variation in the thickness of the boards, and cause the said plates to bear with yielding pressure on the boards. The levers 17 are pivotally supported in the upper end of the arms 19 that are pivoted at 20 in horizontal extensions 21 of the jaws 11—12 and 13. The ends of the levers 17 have link and turnbuckle connections 22 with the extensions 21 to form parallel link motion and cause the gripper plates to remain at all times in their movement in proper parallelism with the jaws. Lugs 23 are provided on the said extensions 21 having set screws 24 to engage the beams 5 and 6 and lock the jaws thereon. The lower ends of the arms 19 have sockets 25 to receive rods 26. Upon the side jaws, arms 13' are pivoted and are adapted to be swung to a point where they will extend across the spaces between the jaws, and the gripper plates and form supports for the side boards when it is desired to set up a box that is of less depth than the length of the jaws. Rock shafts 28 are mounted in bearings on the beams 5 and 6 and are provided with arms 29 carrying the rods 26. Arms 30 are secured on the shafts 28 and have sliding connections with rods 31 upon which coil springs 32 are arranged. The rods 31 are pivotally connected with levers 33 that are pivoted at 34 on the machine frame and are provided with anti-friction rollers 35 that are adapted to travel in cam tracks 36 provided in disks 37 secured to a shaft 38. A large gear 39 is secured on the shaft 38 and meshes with a pinion 40 on a shaft 41. A gear 42 is secured on the shaft 41 and meshes with a pinion 43 that is provided with a disk 44 and is adapted to be moved into frictional engagement with a similar disk 45 that is rigidly mounted on the frame of the machine. The pinion 43 is secured to the hub 46 of a clutch member 47 loosely mounted on a shaft 48, the other clutch consisting of a disk 49 is secured on the shaft 48 and has a series of blocks 50 thereon to enter tapered sockets 51 in the clutch member 47. The hub 46 is adapted to slide back and forth on the shaft 48, and is provided with a clutch ring 52 that is connected by a link 53 with an arm 54 on a shaft 55. A lever 56 is secured at 56' on the machine frame and has a socket 57 wherein a treadle 58 is adjustably mounted and provided at one end with a weight 59. A hardened steel tooth 60 is provided on the lever 56 and a bar 61 has a hooked end 62 adapted to engage said tooth and is pivotally connected at one end to an arm 63 on the shaft 55. An arm 64 secured on said shaft is pivotally connected with a rod 65 slidable in a bearing 66 on the machine frame and provided with a spring 67 which normally tends to swing the arm 64 to a vertical position and rock the lever 56 to elevate the outer end of the treadle 58. When this treadle is depressed by the attendant, the bar 61 will be moved lengthwise, the shaft 55 rocked in its bearing to slide the hub 46 along its shaft and move the clutch members 47 and 49 into interlocking engagement with one another, thus transmitting the power from the driving pulleys 48' to the operating mechanism of the machine. When the bar 61 is released, the spring 67 will return the parts to their normal position, and the disk 44 will be moved into frictional engagement with the disk 45 and act as a brake to stop the machine and I am thus able to bring the moving parts to a standstill almost instantly. For the purpose of tripping the bar 61, releasing the treadle and throwing the machine out of gear, I provide an arm 68 carried by a hub 69 having an opening to receive an eccentric 70 on the shaft 38. The arm 68 extends under the point of the bar 61 and periodically in the revolution of the shaft 38 the arm will be oscillated by the eccentric 70 and the bar 61 tripped to release the treadle and allow the clutch mechanism to be disengaged and thrown to an inoperative position. A crank arm 71 is secured on the shaft 38 and has a link connection 72 with a disk 73 that is secured to a flange 74 provided on an interiorly threaded hub 75 that is mounted on a threaded portion 76 of a shaft 77. The hub 75 has an operating wheel 78. A disk 79 is keyed on the shaft 77 and has a series of ratchet teeth 80 adapted to register with a corresponding series on the disk 73, thereby locking them together when the hub 75 is moved toward the disk 79. When the hub is moved away from the disk 79 by the operation of the wheel 78, the teeth of the disk 73 will be withdrawn from engagement with those of the disk 79 and the disk 73 may oscillate with its hub without imparting a corresponding movement to the shaft.

An operating wheel 81 is mounted on the threaded portion 76 by means of which the attendant can revolve the shaft 77. This shaft has a middle portion that is substantially square in cross section as indicated in Fig. 4, and projects transversely through openings 82 in the beams 5 and 6. Upon this shaft pinions 83 are mounted. Rack bars 84 and 85 are arranged to engage the teeth of these pinions, the former being arranged above the pinions and the latter below them, and bolted respectively to end jaws 86 and 87 that are slidably mounted on the beams 5 and 6. These jaws carry clamping plates 88 and 89 between which the end box boards are held during the clamping or squeezing operation. The plates are capable of a slight adjustment by means of pins 90, fitting within sockets 91 and provided with adjusting bolts 92. Similar bolts 93 are mounted on the lower portions of the jaws and are adapted to engage the clamping plates and aid in the vertical alinement of the same with respect to the walls of the box. The clamping plates 89 are provided with a series of tenons 93' corresponding to those formed on the ends of the box walls.

The clamping plates are provided with centering plates 94, pivoted at 95 and having ends 96 that are adapted to project between and beyond the tenons 93' and center the ends of the boards therein, thereby preventing the crushing or damaging of the dovetailed joints during the assembling of the walls of the box. These centering plates are arranged to swing backwardly between the tenons and be out of the path of the boards when they are squeezed together. Springs 97' are provided to hold the centering plates in their projected position. The end jaws have lugs 97 and 98 thereon to support the end boards of boxes of different sizes.

The operation of the machine is as follows:—The attendant will first adjust the beam 5 toward or from the beam 6, according to the size of the box to be assembled. The boards forming the side walls are placed in the jaws and securely held by means of the gripper plates, which are adapted to yield and accommodate themselves to the varying thickness of the board. These plates are lever-operated and are held by means of a parallel link motion in parallel relation with the jaws at all times. A clutch mechanism is provided, the movement of which is controlled by a treadle, which when depressed, will move the clutch members into interlocking engagement with one another and transmit power from the driving pulleys to the operating mechanism of the machine. Upon the release of the treadle, the stop motion disks will be moved into engagement with one another to bring the moving parts to a standstill. Periodically in the revolution of the shaft 38, an arm 68 extending under the bar 61 will be oscillated and the bar tripped to release the treadle and permit the clutch mechanism to be disengaged and thrown to an inoperative position. End jaws receive the end boards and have clamping plates between which the said end boards are held during the squeezing operation. The clamping plates have centering means, the function of which is to prevent the crushing or damaging of the dovetail joints. These plates move out of the path of the boards when they are squeezed together and the parts having been properly adjusted for the size of the box to be assembled, the operator will depress the treadle operating the clutch mechanism, clamping the boards forming the side and end walls and causing the movement of the jaws to squeeze the dove-tailed ends of the boards into interlocking engagement with one another. When this has been done, the clamps are released and the apparatus is ready to repeat the operation.

I claim as my invention:

1. In a machine of the class described, the combination, with a frame, of side jaws adapted to support the side boards of a box, arms pivoted on said jaws, levers carried by said arms, yieldingly-mounted gripper plates carried by said levers and between which and said jaws the side boards are gripped and held, end jaws arranged to slide toward and from said side jaws and support the end boards of a box, and means for moving said end jaws inwardly to press the interlocking ends of the side and end boards together.

2. In a machine for setting up dove-tail boxes, side jaws adapted to support the side boards of a box, arms pivoted on said jaws, levers carried by said arms, yieldingly-mounted gripper plates carried by said levers and between which and said jaws the side boards are gripped and held, means for adjusting said levers to aline said plates, means for oscillating said arms, end jaws adapted to support the end boards of a box, and means for moving said end jaws inwardly to press the interlocking ends of the side and end boards together.

3. In a machine of the class described, the combination of a frame, parallel beams mounted therein, one of said beams being adjustable toward and from the other one, side jaws carried by said beams and adapted to support the side boards of a box, arms pivoted on said jaws, levers carried by said arms, yieldingly mounted gripper plates carried by said levers and between which and said jaws the side boards are gripped and held, means for adjusting said levers to aline said plates, and means for oscillating said arms to move said plates to an operative or inoperative position.

4. In a machine of the class described, the combination with the side jaws and means supporting them, said jaws being adapted to receive the side boards of a box, of arms pivoted at points intermediate to their ends on said jaws, gripper plates supported by said arms, springs interposed between said arms and said gripper plates, and holding said plates toward said jaws with a yielding pressure and means for oscillating said arms to move said plates to a gripping position or release them, substantially as described.

5. In a machine of the class described, the combination with the side jaws and means supporting them, of arms pivoted on said jaws, levers carried by said arms, gripper plates yieldingly supported by said levers, adjustable means connecting said levers with fixed points on said jaws, and forming a parallel link motion with said arms, and means for tilting said arms on their pivots to move said gripper plates toward or from said jaws, substantially as described.

6. In a machine of the class described, the combination with a frame, of parallel beams mounted therein, one of said beams being movable toward and from the other beam, side jaws mounted on said beams, and adapted to support the side boards of a box, gripper plates between which and said jaws the boards are gripped and held, pivoted arms whereon said gripper plates are supported, a rock shaft and arms thereon operatively connected with said pivoted arms, a driving shaft, a disk thereon having a cam track and an arm having a pin to travel in said cam track and operatively connected with said rock shaft to oscillate the same and thereby move said gripper plates, substantially as described.

7. In a machine of the class described, the combination with the side jaws adapted to receive and support the side box boards, of gripper plates between which and said jaws the boards are gripped and held, arms pivoted on said jaws and whereon said gripper plates are supported, rods fitting within sockets in said arms, rock shafts connected with said rods, arms secured on said rock shafts, pivoted levers having sliding connections with said arms, disks having cam tracks therein adapted to receive anti-friction rollers on said levers, whereby said rock shafts will be oscillated and said gripper plates moved toward or from said jaws to grip or release the boards, substantially as described.

8. In a machine of the class described, the combination with parallel beams, of end jaws slidably mounted thereon, rack bars secured to said jaws, a shaft extending transversely of said beams and projecting through openings therein, pinions secured on said shaft and meshing with the teeth of said rack bars, and said bars extending transversely of said shaft above and below the same, whereby the revolution of said shaft will move said jaws toward or from each other, and means for rocking said shaft to impart to said jaws a limited movement, substantially as described.

9. In a machine of the class described, the combination with a frame, of parallel beams mounted therein, jaws slidably arranged on said beams and movable toward and from one another, a shaft extending transversely of said beams and operatively connected with said jaws, means for revolving said shaft to adjust the opposite jaws toward or from each other, means for rocking said shaft to impart to said jaws a limited movement, and means for rendering said rocking means operative or inoperative as desired.

10. In a machine of the class described, the combination with the sliding end jaws and means supporting the same, of a shaft operatively connected with said jaws, a disk secured on said shaft and having a series of ratchet teeth thereon, a second disk loosely mounted on said shaft, and also having a series of teeth adapted to mesh with the teeth of said first named disk, means for moving said second named disk into engagement with said first named disk, and means connected with said second named disk for imparting a rocking movement thereto, and to said shaft for the purpose specified.

11. In a machine of the class described, the combination with the sliding end jaws, and means supporting the same, of a shaft operatively connected with said jaws, means for revolving said shaft to adjust said jaws, a disk secured on said shaft, and having a series of teeth, a second disk loosely mounted on said shaft, and having teeth to engage those of said first named disk, means for moving said second named disk toward or from said first named disk, said means comprising a hub having a threaded connection with said shaft, and an operating wheel therefor, and means connected with said second named disk for rocking the same and imparting a limited movement to said shaft and to said jaws, substantially as described.

12. In a machine of the class described, an end jaw and clamping plates adjustably mounted thereon, said clamping plates having vertical flanges and tenons formed therein, and horizontal centering plates pivoted near one end and yieldingly supported in said tenons, substantially as described.

13. In a machine of the class described, the combination with the jaws and means for supporting the same, of clamping plates carried by said jaws and having a series of tenons formed thereon, horizontal centering plates carried by said clamping plates, and pivoted at one end and having opposite ends projecting between and beyond said tenons, and springs for normally holding said centering plates in their projected position, substantially as described.

14. In a machine of the class described, the combination with a driving shaft, of a disk secured thereon, a pinion slidably mounted on said shaft and having a disk to engage said first named disk, a clamping mechanism having a clutch connection with said pinion, a rock shaft operatively connected with said pinion for moving its disk into engagement with the shaft disk or separating them, an arm secured on said rock shaft, a spring pressed bar connected to said arm, said bar having a hooked end, a pivoted arm having a part in engagement with the hooked end of said bar and provided with an operating treadle, and means for automatically tripping said bar to release said rock shaft at a predetermined point, substantially as described.

15. In a machine of the class described, the combination with a frame, of a driving shaft mounted therein, clamping jaws having gripper plates operatively connected with said driving shaft, a clutch mechanism, a rock shaft connected therewith, an arm secured on said shaft, a bar connected to said arm and having a hooked end, an arm having a part to engage the hooked end of said bar and provided with an operating treadle, a shaft geared to said drive shaft and having an eccentric thereon and an arm oscillated by the movement of said eccentric and arranged to trip said bar and release said rock shaft, substantially as described.

16. In a machine of the class described, the combination, with a frame and a drive shaft, clamping jaws operatively connected with said drive shaft, a clutch mechanism, a rock shaft connected therewith, an arm secured on said rock shaft, a bar connected with said arm, a second arm having a part to engage said bar and provided with an operating treadle, a shaft geared to said drive shaft and having an eccentric thereon, means for locking said rock shaft and means oscillated by the movement of said eccentric and arranged to trip said bar and release said rock shaft.

17. In a machine of the class described, the combination, with a frame, of clamping jaws mounted thereon, gripper plates between which and said jaws the boards are gripped and held, a drive shaft operatively connected with said clamping jaws, a clutch mechanism, a rock shaft connected therewith, means for rocking said rock shaft, a shaft geared to said drive shaft and having an eccentric thereon, means for locking said rock shaft against premature movement, and means operated by the movement of said eccentric for tripping said locking means and releasing said rock shaft.

18. In a machine of the class described, the combination, with the side jaws, and means supporting them, of gripper plates, levers whereon said plates are supported, means connecting said levers with fixed points, arms whereon said levers are mounted and forming a parallel link motion therewith, and means for tilting said arms to move said gripper plates toward or from said jaws.

19. In a machine of the class described, an end jaw and clamping plates adjustably mounted thereon, said clamping plates having vertical flanges, and tenons formed therein, and horizontal pivoted centering plates supported in said tenons.

In witness whereof I have hereunto set my hand this 15th day of June, 1908.

JAMES H. DODDS.

Witnesses:
RICHARD PAUL,
C. G. HANSON.